United States Patent [19]
Carn

[11] 3,754,772
[45] Aug. 28, 1973

[54] APPLIANCE FOR THE TRANSPORT AND LAUNCHING IN PARTICULAR FOR BOATS AND OTHER APPLICATIONS

[76] Inventor: Patrick Carn, 81 Route de Benodet, Quimper (Sud Finistere), France

[22] Filed: Mar. 10, 1971

[21] Appl. No.: 122,752

Related U.S. Application Data
[63] Continuation-in-part of Ser. No. 889,258, Dec. 30, 1969, abandoned.

[30] Foreign Application Priority Data
Mar. 10, 1970  France .............................. 7008573

[52] U.S. Cl...... 280/47.13 B, 152/352, 280/DIG. 7, 301/5 R
[51] Int. Cl............................................. B60p 3/10
[58] Field of Search .............. 280/47.13 R, 47.13 B, 280/47.24, 47.32, 414 R, 414 A, 414 B, DIG. 7; 152/352, DIG. 18; 301/5 R, 41 R; 9/1 T

[56] References Cited
UNITED STATES PATENTS

| | | | |
|---|---|---|---|
| 2,967,058 | 1/1961 | Hoffman, Jr..................... | 301/5 R X |
| 3,333,861 | 8/1967 | Hoffman.......................... | 280/47.32 |
| 3,386,749 | 6/1968 | Roudanez........................ | 280/47.3 |
| 2,998,996 | 9/1961 | Aghnides........................ | 301/5 R X |
| 2,740,135 | 4/1956 | Church....................... | 280/414 A X |
| 1,939,863 | 12/1933 | Seiter........................... | 280/414 R X |
| 2,664,577 | 1/1954 | Sanborn...................... | 280/414 A X |
| 2,966,368 | 12/1960 | Engnell....................... | 280/414 A X |
| 3,125,351 | 3/1964 | McDonough................. | 280/47.13 B |
| 2,347,947 | 5/1944 | Hamilton ................. | 280/47.13 R X |
| 3,197,223 | 7/1965 | Dickerson et al................. | 280/36 R |

FOREIGN PATENTS OR APPLICATIONS

| 5,145 | 4/1912 | Great Britain .............. | 280/47.13 B |

OTHER PUBLICATIONS
Popular Mechanics, August 1958, p. 132.

*Primary Examiner*—Kenneth H. Betts
*Assistant Examiner*—Leslie J. Paperner
*Attorney*—John W. Behringer, Eugene L. Bernard, Martin J. Brown, James N. Dresser, W. Brown Morton, Jr., John T. Roberts, Malcolm L. Sutherland and Morton, Bernard, Brown, Roberts and Sutherland

[57] ABSTRACT

This invention relates to improvements in apparatus for transporting of boats and includes wide low pressure wheels of asymetrical shape to present a large contact area over soft ground while allowing a boat with a V-bottom hull to ride lower in the apparatus, thereby increasing the stability.

6 Claims, 6 Drawing Figures

APPLIANCE FOR THE TRANSPORT AND LAUNCHING IN PARTICULAR FOR BOATS AND OTHER APPLICATIONS

This is a continuation-in-part of U.S. Pat. application Ser. No. 889,258 filed Dec. 30, 1969 and now abandoned.

The United States of America application Ser. No. 889,258 relates in a general manner to a transport and launching device and in particular to a carrier chassis provided with an adjustable means of support enabling it to adapt itself to the profile of the load to be transported, said chassis being provided with at least one pair of wheels with a curved genetrix that are wider than they are long.

According to an other characteristic feature of the United States of America application Ser. No. 889,258, the chassis consists of a tubular unit bent at each of its extrmities to form an arch, said bent extremities being traversed from end to end by an axle for the broad tread wheels with a curved genetrix; a strut of which one extremity serves as a bearing support for the axle which traverses the two extremities of the arch is provided in the median zone of the straight part of the arch in order to ensure that the straight part of the arch is rigid and to ensure that the axle of the broad tread wheels with a curved genetrix are rigid.

According to an other characteristic feature of the United States of America application Ser. No. 889,258, the adjustable means of support consist of a pair of removable frames fitted by simple engagement on the straight section of the chassis in a way such that the frames are perpendicular to said section of chassis.

According to a characteristic feature of the United States of America application Ser. No. 889,258, at least one fixed or articulated rigid rod is provided on the chassis in order effectively to guide the loads that are transported.

According to a characteristic feature of application Ser. No. 889,258, the appliance consists of a chassis with four wheels comprising three parallel long members whose extremities constitute support bearings for the axles of the wheels, these long members being connected across their median part by a tubular cross-piece whose extremities are arranged to constitute support bearings inside which lodge the axles of a drawing-shaft, the tubular cross-pieces being able to oscillate about the axles of the shaft in a way such that the long members which carry the axles of the broad tread wheels behave in a manner of an equalising beam.

The object of the present addition is the improvement of the main application; it therefore relates to a transport and launching appliance particularly for boats according to the main patent application, to the first and second certificates of addition in which, the broad tread wheels with a curved genetrix are wider than they are long and are designed in a way that a pair of wheels carried by a common axle has a wider tread than that in the main application, the chassis of this appliance being maintained at its original width.

An appliance for the transport of loads according to the present addition is represented but not limited by the accompanying drawings in which.

Figure 1:
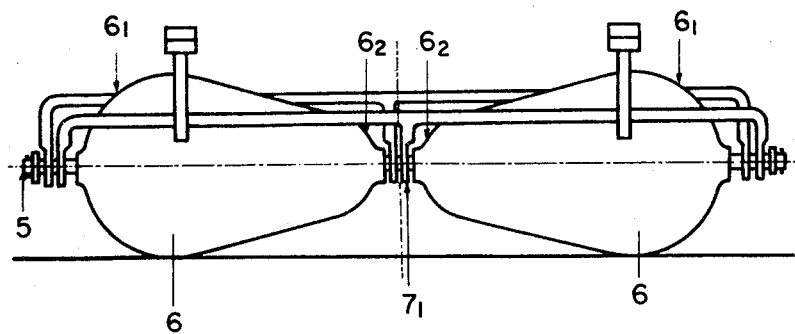
FIG. 1 is a front view of the appliance showing the asymmetric profile of the large tread wheels.
Figure 2:
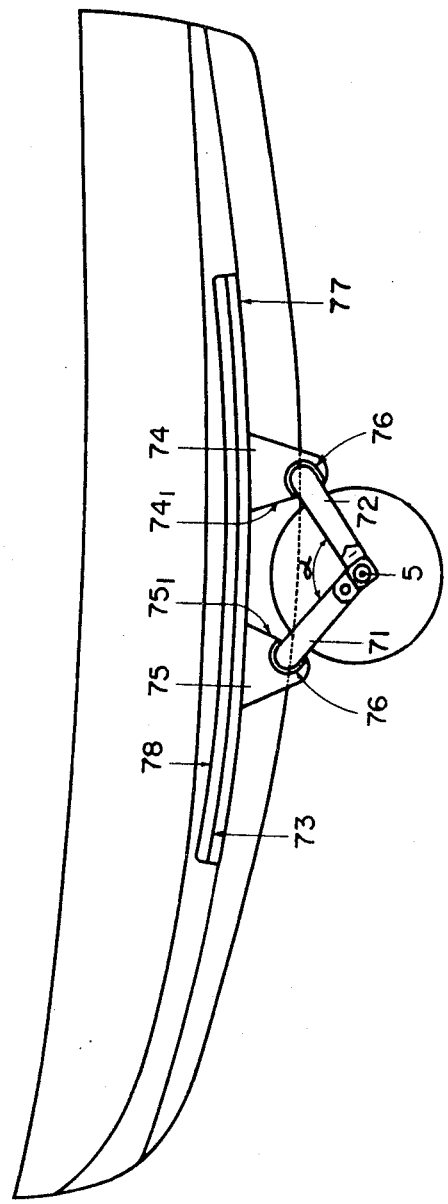
FIG. 2 is a side view of the appliance onto which a boat has been loaded.

According to the invention and as is shown in FIGS. 1 and 2, the object of the appliance for the transport of loads particularly boats is to improve the application.

In the main application the wheels of the transport appliance had a symmetrical profile so that when a pair of wheels with a curved genetrix were mounted on the same axle, the support polygon was circumscribed by the gap between the two larger circumferences of said wheels.

When an appliance for the transport of loads transported a relatively tall load, there was a risk when the appliance was used over rough ground of the load being transported leaving the support polygon which constituted a risk of said load being spilt.

The object of the present addition is in particular to overcome this disadvantage by increasing the size of the support polygon of the appliance for the transport of loads, by lowering the center of gravity of the transported load without however changing its dimensions, with particular reference to the wheel treads or eliminating the possibility of rolling the load on the wheels when the appliance is being placed in position.

To obtain this result as is shown in FIG. 1 the axle 5 of the appliance is equipped with a pair of broad tread wheels 6 which have an asymmetric profile.

The wheels according to the main application, the first and second certificates of addition, should preferably be inflatable and have a curved genetrix. The broad tread wheels are wider than they are high, and each wheel in the proximity of one of the extremities $6_1$ has a circumference which is greater than that of its opposite extremity $6_2$. The wheels 6 are mounted on the axle 5 in a way such that the small circumferences $6_2$ facing one another are practically adjacent while the large circumferences $6_1$ are located in the proximity of the extremities of the carrier axle 5.

On account of this arrangement the gap between the large circumferences $6_1$ of a pair of wheels are considerably increased which enables the support polygon of the installation to be enlarged by as much. This arrangement also has the additional advantage of forming, by means of the small circumferences $6_2$ facing one and another, a support surface to hold the stem of a boat which enables said stem to be displaced by rolling, the stem of the boat to the mean level of its midship frame being in contact with said support surface and generally having a flat or slightly bulging base, only a slight effort is then needed to place the load-supporting frames in position.

Figure 4:
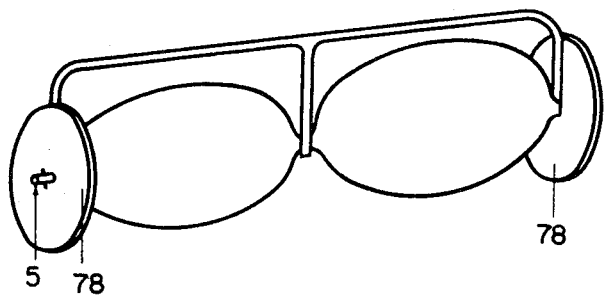
FIG. 4 is a perspective view showing a transport appliance according to the main patent, equipped with auxiliary wheels to widen the wheel tread, without change in the dimensions of the chassis.

In the application shown in FIG. 4, the transport appliance comprises wheels that are identical to those described in the main application.

For this application the widening of the wheels is effected by the addition of relatively rigid narrow and thin auxiliary wheels 78, placed at the extremity of the axle 5, common to these wheels.

This application is particularly advantageous when the transport appliance has to travel alternatively on hard and prepared ground and on beaches with soft sand. For on soft ground, the broad tread wheels carry the major part of the load without sinking in, while the thin wheels, which sink in only a little, offer little resistance to the movement.

On hard ground, the thin wheels carry all or part of the load which avoids the unnecessary deformation of the broad tread wheels, and during a prolonged period when the appliance does not move the weight of the load does not cause the formation of flat surfaces on the deformable wheels because the weight is borne on the non-deformable wheels.

This advantage can also be obtained in all systems other than those involving rigid wheels, for example stilts or similar supports placed in position when the appliance is at rest to support the weight of the assembly in place of the deformable wheel.

The transversal stability of the assembly is thereby very considerably improved.

The auxiliary wheels 78 can be used with advantage in the application shown in FIG. 1 in which the transport appliance is equipped with asymmetric wheels.

In that case the stability gained by the widening of the wheel tread is relatively small but is nevertheless valuable for mixed usage of a hard and soft ground.

According to a characteristic feature of the present addition, the chassis supporting the load ( FIGS. 1 and 2 ) is in the shape of two arches 71 and 72, identical in principle to the arch of the chassis described in the main application.

Each arch has two bent extremities forming a support bearing for the axle 5 of the broad tread wheels. Each arch 71 and 72 comprises, in the proximity of the median part of its straight section, a strut $7_1$ whose extremity also serves as a support bearing for the axle 5, thus avoiding any danger of bending the latter.

Both the arches 71 and 72 are articulated on the axle of the broad tread wheels in a way such that they can in particular take up two positions, one taking up little space in which the two arches merge in adjoining planes, the other in which the arches make an angle the opening of which is restricted for the transport of a load.

According to the main application frames are provided for supporting the load therefore and which fix onto the chassis by simple engagement.

According to a characteristic feature of the present addition, each frame 73 is provided, on its face turned toward the broad tread wheels, with two supports 74, 75 the distance apart of which is defined by the angle of the opening formed by the arches 71, 72 of the chassis.

Figure 3:
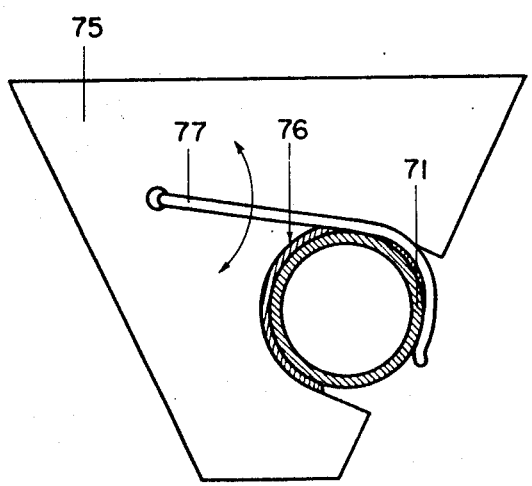
FIGS. 3 and 3a are partial sectional views of one of the supports of the frames that can be locked in position on the straight part of one of the arches constituting the chassis.
Figure 3A:
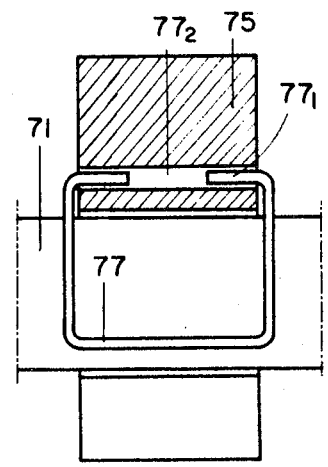

The supports 74, 75 comprise, on their sides $74_1$, $75_1$, a slot 76, opposite them, which holds by simple engagement a portion of the straight arch of the arches 71, 72. This arrangement automatically locks the arches into the slots of the supports, in particular when the weight of a load presses down on the frames. To prevent the arches emerging from the slots of the supports when the frames 73 are not loaded, a rod 77 which necessarily takes up the shape of the tube 71, 72, over more than quarter of its circumference is provided in front of each slot as shown in FIG. 3. The rod 71 consists of a round metallic wire with extremities $77_1$ in the form of an axle lodging in the bore $77_2$ made across the support 75 in a way such that the branches of said rod can pivot on the axle $77_1$ to take up two positions, one for freeing the slot 76 from the support, the other for bolting the locking device of said slot in order to maintain the tubular part in the arches 71, 72. The slots in the supports are covered with a friction coating, for example, an elastomer, to prevent any change in the selected distance between the supports on the arches 71, 72. Each frame comprises two supports, the load being distributed over the four points of the arch.

The angle of the opening between the arches 71, 72 is selected in a way such as to ensure that the centre of gravity of the load supported by said frames is as low as possible, the greatest circumference $6_1$ of the asymmetric wheels being able to touch the load transported by the frame, while the space formed between the little circumferences $6_2$ can be partially occupied by the keel of a boat.

The frames are made of a board of flexible wood 77, which makes them unsinkable, the flexibility of the board and the rotation of the supports about the tubes enable the frames to take up the shape of the longitudinal profile of the hull that is supported.

The upper part of the frames which receives the load is preferably coated with a protective layer 78.

The appliance according to the invention has a number of advantages : apart from the facility it has of moving over irregular or loose ground, the particular profile of the broad tread wheels prevents the soil making piles in the path of the moving transport appliance, while avoiding any sinking into the surface of the ground when the large circumferences exhibit a tendency to sink in.

According to the main application, the appliance according to the present addition can be made to pass from the position in which it occupies the least space to its operating position very rapidly without any tool whatsoever.

Because of the lightness and small size of the assembly, it is possible to load the trolley onto the boat and thereby obtain an additional reserve of buoyancy.

Figure 5:
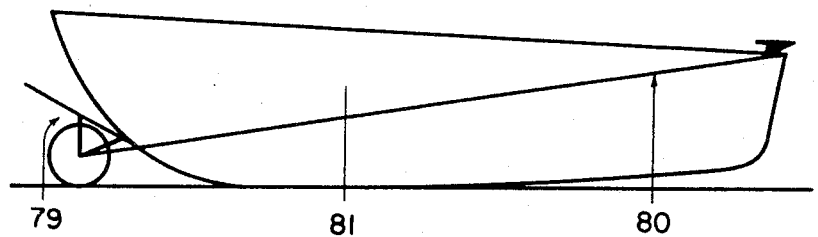
FIG. 5 is a diagrammatic view showing the transport device placed on position underneath a boat.

As is shown in FIG. 5, to enable one person alone to place the transport appliance 79 in position underneath the boat 81, the appliance 79 is placed in front of the extreme point of the stern of the boat and the chassis of the appliance.

All that is required then is to lift the stem of the boat in order to drag the appliance which moves in response to the action of elastic cords toward the direction of the middle of the boat which it will support at the level of its center of gravity.

It is obvious that the invention is not limited to the examples of its application herein above described and illustrated and that it is possible on the basis of these embodiments to envisage other forms and applications within the scope of the invention.

I claim:

1. In an apparatus for the transportation of loads, particularly boats, comprising:
   a. a pair of inflatable load bearing wheels;
   b. said wheels mounted on a common axle;
   c. said wheels extending through substantially the entire width of the load;
   d. said wheels having an assymmetrical profile such that in the proximity of one of their extremities, there is a circumference which is smaller than the circumference adjacent the other extremity;

e. said wheels mounted on said common axle having their smaller circumferences adjacent while the larger circumferences are mounted in the proximity of the extremity of said axle which carries them;
f. a pair of auxiliary wheels of non-deformable compositions, said wheels of approximately the same diameter as said inflatable wheels;
g. said auxiliary wheels having a thin profile;
h. said auxiliary wheels mounted on said common axle at either extremity of said axle while said inflatable wheels are mounted on said axle interior of the auxiliary wheels;
i. a load supporting structure above said wheels and rigidly supported by said axle at either extremity of said axle and at the center of said axle between said inflatable wheels.

2. An apparatus for the transportation of loads, particularly boats, comprising:
a. a pair of inflatable wheels mounted on a common axle,
b. each of said wheels having a broad tread and having an elliptical profile,
c. a pair of auxiliary wheels of non-deformable composition, said wheels of approximately the same diameter as said inflatable wheels,
d. said auxiliary wheels mounted on said common axle at the extremity of said axle, while said inflatable wheels are mounted on said axle interior of the auxiliary wheels,
e. a boat supporting structure above said wheels rigidly supported by said axle,
f. said support structure comprising two arches, each having their ends terminating at and journaled on the extremity of the axle,
g. said arches rotatable on said axle,
h. each of said arches held in load-bearing position by a transverse support beam.

3. Apparatus for the transport of loads according to claim 2 in which the transverse support beam is in the form of a flexible rod, resiliently deformable to the longitudinal profile of the load it supports.

4. The apparatus for the transport of loads according to claim 2 in which each transverse support beam has a pair of depending supports, each support has a semicircular indentation, each of said indentations cooperating with a portion of the arch in the load-supporting position, said indentations being on the interior sides of said supports, said arches pressing outwardly and locking in said load-supporting positions.

5. The apparatus for the transport of loads according to claim 4 in which the indentations in the supports are fitted with a friction coating.

6. The apparatus for the transport of loads in accordance to claim 4 in which the indentations in the support are locked by a movable locking bolt to retain said arches in said indentations.

* * * * *